US007734252B2

(12) United States Patent
Mechaley, Jr.

(10) Patent No.: US 7,734,252 B2
(45) Date of Patent: Jun. 8, 2010

(54) SYSTEM AND METHOD FOR WIRELESS TRANSACTIONS

(75) Inventor: Robert G. Mechaley, Jr., Kirkland, WA (US)

(73) Assignee: Eagle River Holdings LLC, Kirkland, WA (US)

( * ) Notice: Subject to any disclaimer, the term of this patent is extended or adjusted under 35 U.S.C. 154(b) by 652 days.

(21) Appl. No.: 11/465,412

(22) Filed: Aug. 17, 2006

(65) Prior Publication Data
US 2008/0046258 A1 Feb. 21, 2008

(51) Int. Cl.
*H04B 5/00* (2006.01)
(52) U.S. Cl. .................. 455/41.1; 455/414.1; 455/41.2; 455/41.3; 705/413; 235/380
(58) Field of Classification Search .............. 455/414.1, 455/41.1, 41.2, 41.3; 705/413; 235/380
See application file for complete search history.

(56) References Cited
U.S. PATENT DOCUMENTS

| | | | |
|---|---|---|---|
| 5,942,978 A | 8/1999 | Shafer | |
| 6,070,156 A * | 5/2000 | Hartsell, Jr. | 705/413 |
| 7,209,733 B2 | 4/2007 | Ortiz et al. | |
| 2004/0172339 A1* | 9/2004 | Snelgrove et al. | 705/26 |
| 2005/0040228 A1* | 2/2005 | Mullins et al. | 235/380 |
| 2008/0210754 A1* | 9/2008 | Lovett | 235/380 |

\* cited by examiner

*Primary Examiner*—Temica M Beamer
(74) *Attorney, Agent, or Firm*—Michael J. Donohue; Davis Wright Tremaine LLP (57) ABSTRACT

A system and method for using a consumer wireless device in retail transactions utilizes a fixed communication device that functions as a base station for the consumer wireless device. The fixed communication device has a limited coverage zone. When a consumer wireless device comes within the coverage zone of the fixed communication device, the consumer wireless device selects the fixed communication device as the preferred base station and initiates a registration with that base station. The consumer wireless device is uniquely identified with ID data transmitted by the consumer wireless device to the fixed communication device. The unique identification is subsequently used in the process of completing a transaction.

60 Claims, 6 Drawing Sheets

SYSTEM AND METHOD FOR WIRELESS TRANSACTIONS

BACKGROUND OF THE INVENTION

1. Field of the Invention

The present invention is directed generally to wireless communications and, more particularly, to a system and method for wireless communication involving the transmission of indemnification data for retail transactions.

2. Description of the Related Art

Cellular telephones, personal communication system (PCS) devices, personal digital assistants (PDA) and other forms of wireless communications are ubiquitous. Many individuals have one or more of these communication devices. In some embodiments, multiple functionalities are incorporated into a single device. For example, it is known to combine a wireless telephone with a PDA.

Telephones, and wireless devices may also be used to obtain services. For example, it is possible to dial a telephone number to receive a daily horoscope, a joke of the day, or the like. In another example, consumers may dial a telephone number using a "900" area code. In these examples, some services are delivered to the consumer via the telephone and, in turn, the consumer pays for the services through billing to the consumer's telephone company. While it is known to use a telephone for services delivered through the telephone, there is no convenient technique by which one may use a telephone to complete a transaction in a retail setting. Although consumers often carry one or more wireless communication devices, these devices are not used to complete a transaction in a retail setting. Therefore, it can be appreciated that there is a significant need for a system and method that allows a wireless communication device to be used to complete a transaction in a retail setting. The present invention provides this and other advantages as will be apparent from the following detailed description and accompanying figures.

DETAILED DESCRIPTION OF THE INVENTION

The system and method described herein utilizes existing wireless communication frequencies licensed for wide-area wireless networks. One component of the system resides in a retail facility. The operation of the retail facility system will be described in greater detail below. The other portion of the system is a consumer wireless device. The device may be a cell phone, PCS device, PDA device, or the like. These conventional devices operate at assigned frequencies. For example, some cell phones operate in the 800 MHz band while PCS devices operate in the 1.9 GHz band. Some devices are multimode and can operate in an analog mode or a digital mode and are capable of operating in different frequency bands. The assigned frequency bands are licensed for wide area telecommunications. The techniques described herein operate in those licensed bands and communicate with the various consumer wireless devices in a manner consistent with normal operation of those devices. For the sake of convenience, the various devices will be generically described as a consumer wireless device.

Figure 1:
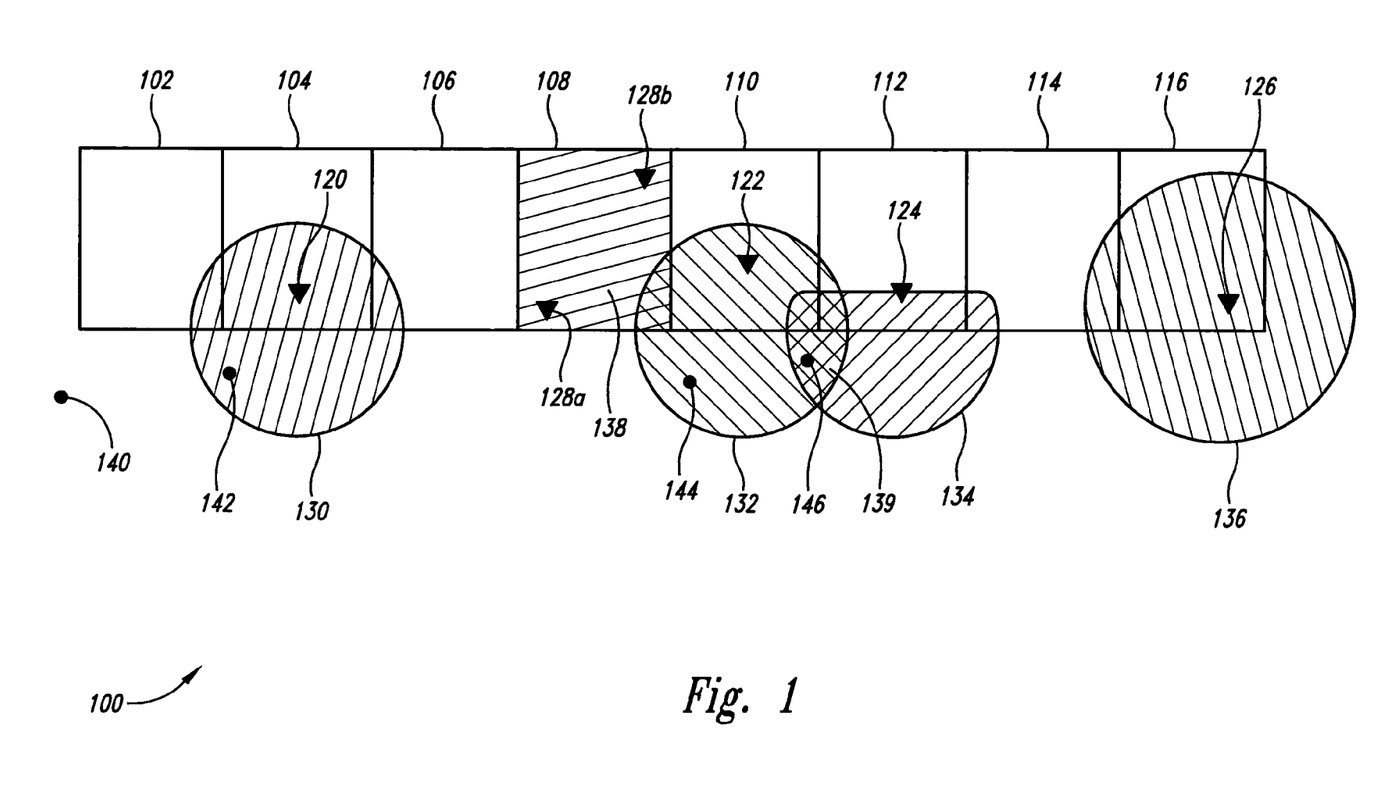
FIG. 1 is a schematic illustration of multiple retail outlets and coverage zones for communication devices contained therein.

FIG. 1 is a schematic illustrating the operation of a system 100 to implement the techniques described herein. FIG. 1 illustrates a plurality of retail facilities 102-116. FIG. 1 illustrates the retail facilities 102-116 in a linear arrangement, as is common in a strip mall arrangement. Those skilled in the art will appreciate that this is for convenience in an illustration only. For example, in a typical shopping mall, the retail facilities 102-116 may line both sides of a wide central aisle. In addition, a retail facility may reside in a kiosk in the center of the central aisle. Retail facilities may be standalone buildings in an urban environment. Thus, the system 100 is not limited to the linear arrangement illustrated in FIG. 1. Furthermore, the retail facilities 102-116 may be indoor, such as the example of an enclosed mall or arcade or outdoors, as in the example of a strip mall.

As illustrated in FIG. 1, some of the retail facilities 102-116 have an associated fixed communication device, which is typically located within the physical confines of the retail facility. In FIG. 1, the retail facility 104 has a fixed communication device 120 while the retail facilities 110, 112, and 116 each have respective fixed communication devices 122-126. The retail facility 108 includes multiple fixed communication devices 128a and 128b. This implementation may be useful in a large retail facility with a large floor space and/or multiple levels.

Each of the fixed communication devices 120-126 is configured to have very short range communication capabilities. The term "fixed communication device," as used herein, refers to the fact that the device is typically stationary during operation rather than any reference to its size or relative portability, however, the low power transmitter and short range antenna may typically be housed in a small portable package. The fixed communication devices 120-128 may be integrated into a single package for ease in installation.

FIG. 1 illustrates a coverage zone 130 associated with the fixed communication device 120. Similarly, the communication devices 122-128 have associated coverage zones 132-138, respectively. As will be described in greater detail below, the goal is to have coverage of at least a portion of the interior of the retail facilities by the fixed communication devices 122-126 associated with the respective retail facilities. FIG. 1 illustrates the coverage zones 130, 132, and 136 as having a circular coverage pattern. However, those skilled in the art will appreciate that different configurations are possible. For example, the fixed communication device 124 for the retail facility 112 may be configured to have a coverage zone 134 having a roughly semi-circular pattern rather than the circular pattern of the coverage zone 132. In yet another alternative embodiment, the fixed communication devices 128a-128b provide a coverage zone 138 that is rectangular in shape to conform approximately to the physical confines of the retail facility 108. The specific pattern of the coverage zones 130-138 are readily configurable to accommodate the physical location of the retail facility. In some cases, the coverage zones may have a certain degree of overlap. For example, the coverage zones 132 and 134 form an overlapping coverage zone 139. Finally, FIG. 1 illustrates the coverage zones 130-138 in a two-dimensional form. Those skilled in the art will appreciate that the actual coverage zone is three-dimensional in nature. However, for simplicity and ease in understanding, the coverage zones 130-138 are merely illustrated in the two-dimensional form of FIG. 1.

The fixed communication devices 120-126 also have configurable coverage ranges by controlling transmission power. For example, the coverage zones 130-132 are approximately equal in size while the coverage zone 136 has a greater range. In a typical implementation, the range of the coverage zone is adjusted so that it may extend in a desired pattern to accommodate the specific environment of the particular retail facility. The range of the coverage zones 130-132 are typically 100-200 feet. However, those skilled in the art will recognize that the range may be decreased or increased from this preferred range. For example, a kiosk in a center isle of a shopping mall may have a circular zone of coverage with a range of approximately 25 feet (i.e., a radius of coverage of approximately 25 feet). Conversely, a "mega store" or warehouse store may have a range that exceeds 200 feet. As those skilled in the art will appreciate, the goal is to control the zone of coverage so that it encompasses only a desired coverage area proximate the location of the retail facility.

FIG. 1 also illustrates sample positions of a plurality of consumer wireless devices 140-146. Those skilled in the art will appreciate that the example locations of the consumer wireless devices 140-146 illustrated in FIG. 1 are temporary. As consumers walk along the street or aisle way of a shopping mall, they walk into and out of the coverage zones 130-138. For example, FIG. 1 illustrates a consumer wireless device 140 that is not within any of the coverage zones 130-138. The consumer wireless device 142 is within the coverage zone 130 while the consumer wireless device 144 is within the coverage zone 132. The consumer wireless device 146 is located within the overlapping coverage zone 139 formed by the overlap of coverage zones 132 and 134.

As the consumer wireless devices move into one of the coverage zones 130-136, the consumer wireless device will begin to communicate with the respective fixed communication devices 120-128. The various elements of the system 100 may now be described in greater detail.

Figure 2:
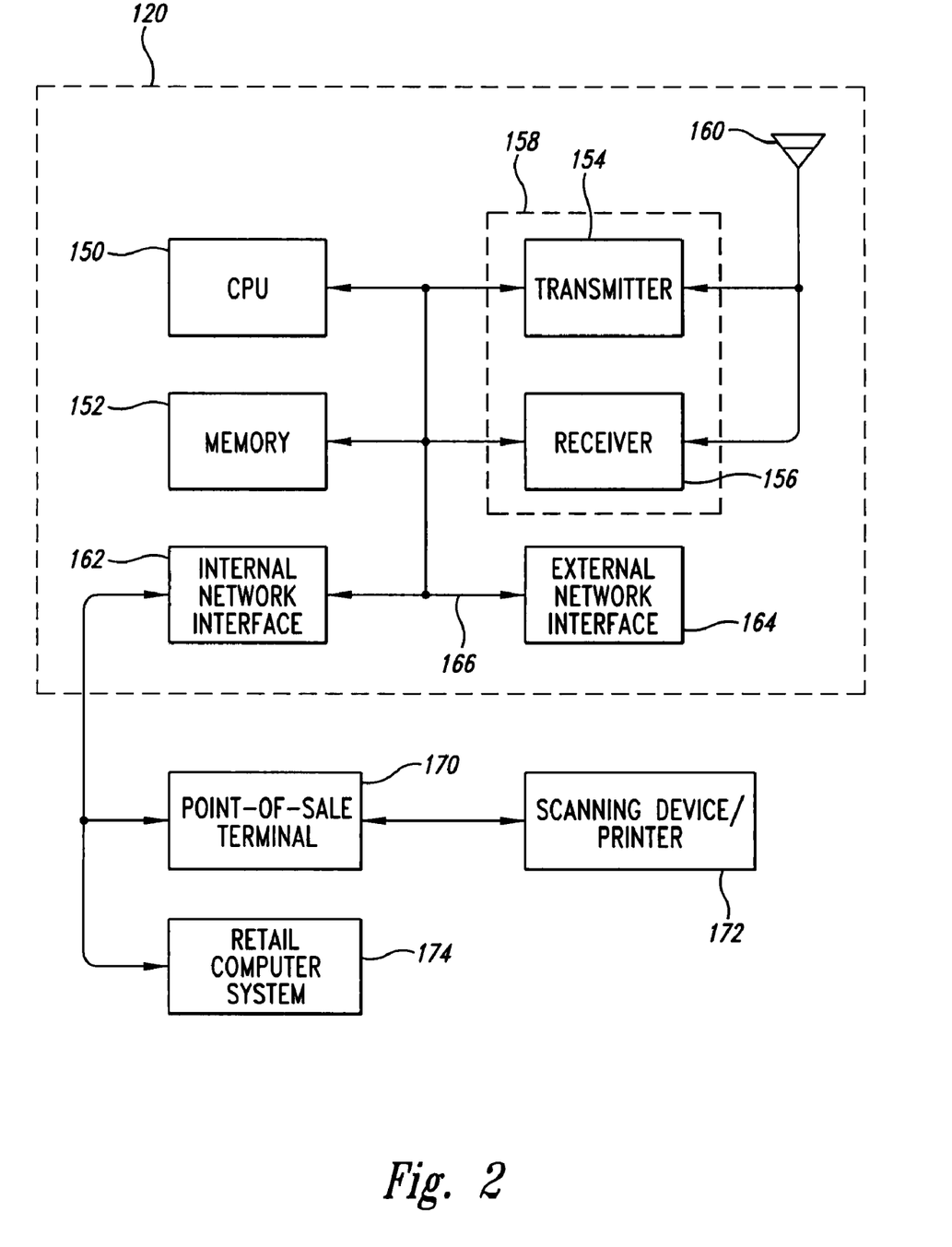
FIG. 2 is a functional block diagram of a fixed communication device positioned within a retail facility.

FIG. 2 is a functional block diagram of the fixed communication device 120. Those skilled in the art will appreciate that the fixed communication devices 122-128 are essentially identical in manner except for operational parameters, such as the coverage pattern of the coverage zones, power transmission levels, and the like. However, these operational parameters are readily understood by those skilled in the art and need not be described in greater detail herein.

The fixed communication device 120 comprises a central processing unit 150 and a memory 152. In general, the CPU 150 receives instructions and data from the memory 152 and executes those instructions. The CPU 150 may be implemented as a conventional microprocessor, microcontroller, programmable gate array, discrete circuit, application-specific integrated circuit (ASIC), or the like. The system 100 is not limited by the specific implementation of the CPU 150. Similarly, the memory 152 may be implemented by a variety of known technologies. The memory 152 may include dynamic memory, static memory, programmable memory, or the like. A portion of the memory 152 may be integrated into a single chip with the CPU 150. The system 100 is not limited by any specific implementation of the memory 152.

The block diagram of FIG. 2 also illustrates a transmitter 154. As will be described in greater detail below, the transmitter 154 transmits data to the consumer wireless devices that come within its coverage zone. As will be described in greater detail below, the transmitter 154 transmits a coupon message to consumer wireless devices that come within it coverage zone.

FIG. 2 also illustrates a receiver 156. As will be described in greater detail below, the receiver 156 is configured to receive data transmitted by one or more of the consumer wireless devices. The receipt of data from the consumer wireless device by the receiver 156 can serve as a verification that the consumer wireless device has received data from the transmitter 154 and is thus capable of two-way communication with the fixed communication device 120. Those skilled in the art will appreciate that the transmitter 154 and receiver 156 may have common circuitry and be implemented as a transceiver 158.

The transmitter 154 and receiver 156 are coupled to an antenna 160. The antenna 160 may be implemented using a variety of known designs, such as omnidirectional antennas, directional antennas, phased-array antennas, and the like. As described above, the antenna coverage pattern may be adjusted in a known fashion to provide a desired pattern that may be uniquely configured for each coverage zone 130-136.

FIG. 2 also illustrates optional components, such as an internal network interface 162 and an external network interface 164. The internal network interface 162 may be a wired interface or may be implemented as a wireless network interface utilizing well known wireless network technology. The optional network interfaces may provide additional data for the fixed communication device 120. For example, the internal network interface 162 allows the fixed communication device 120 to communicate with an in-store network. The in-store network may include, for example, a database or other data structure that contains a list of billing numbers or credit card numbers associated with a uniquely identified consumer wireless device. As will be described in greater detail below, the fixed communication device 120 communicates with any consumer wireless device that comes within range of the fixed communication device and the data exchanged between the fixed communication device and the consumer wireless device may be used to complete the transaction.

The optional external network interface 164 may provide similar data. This may be an effective implementation if the fixed communication device 120 is located in a retail facility that is part of a larger chain of stores. In this manner, a chain-wide sale may be conducted with the same data (e.g., data related to consumer credit card information) across the entire chain. The system 100 may also use an external network for verification of transaction data. For example, credit card transactions are processed an authorization service affiliated with the credit card issuer, which may be different from the retail facility. The external network interface 164 allows communication with a transaction authorization service.

The various components illustrated in FIG. 2 are coupled together by a bus system 166. The bus system 166 may include a power bus, address bus, control bus, data bus, and the like. For the sake of convenience, these various buses are illustrated in FIG. 2 as the bus system 166.

FIG. 2 also illustrates a point-of-sale (POS) terminal 170 and a scanning device/printer 172. As those skilled in the art will appreciate, the POS terminal 170 and scanning device/printer 172 may be integrated into a single system, such as commonly found in a grocery store. Although these components are not part of the fixed communication device 120, they are typically coupled to the fixed communication device via the internal network interface 162. As will be described in greater detail below, the scanning device/printer 172 may be used to read data displayed on the consumer wireless device and, optionally, to print a receipt or other transaction identification information used in the completion of the transaction. The POS terminal 170 may be used to complete the transaction, particularly if the transaction involves a sale to the consumer.

The functional block diagram of FIG. 2 also illustrates a retail computer system 174, which is coupled to the fixed communication device 120 via the internal network interface 162. The retail computer system 174 is a conventional device containing common computer components, including a CPU, memory, disk storage, internal and external network interfaces, and the like. For the sake of brevity, those devices are not illustrated in the functional block diagram of FIG. 2. However, as will be described in greater detail below, the retail computer system 174 may be used in processing consumer transactions internally within the retail facility or in controlling communication with other computers external to the retail facility. In an implementation where the retail computer system 174 communicates externally, it is possible to eliminate the external network interface 164 from the fixed communication device 120.

As will be described in detail below, the POS terminal 170 receives data from the fixed communication device 120 that uniquely identifies the consumer and allows the POS terminal to generate appropriate transaction data.

Figure 3:
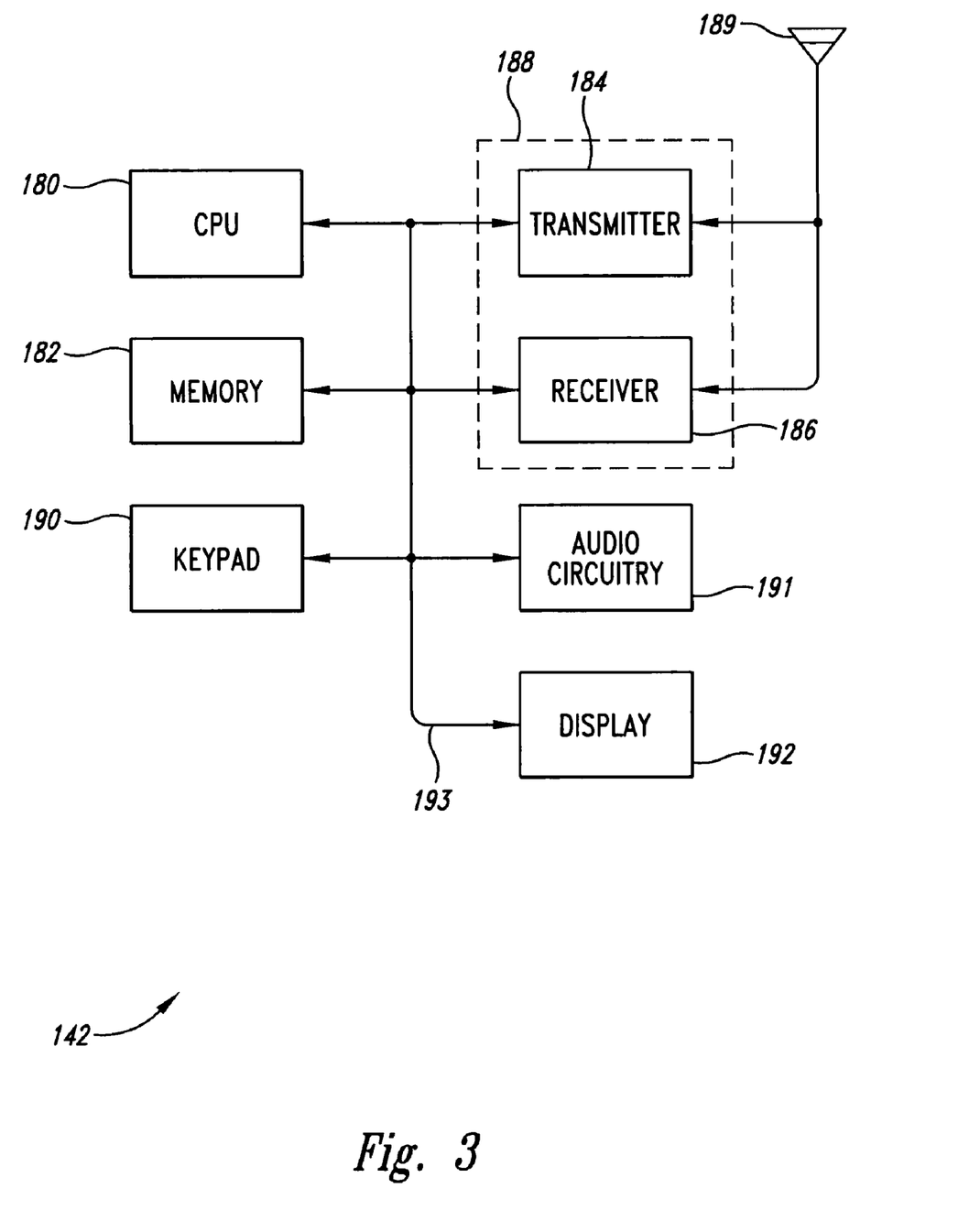
FIG. 3 is a functional block diagram of a portable wireless communication device.

FIG. 3 is an example functional block diagram of the consumer wireless device 142. Those skilled in the art will appreciate that the other consumer wireless devices 140 and 144-146 contain similar circuitry and operate in a functionally identical manner. Details of each of the consumer wireless devices 140-146 are not necessary.

As illustrated in FIG. 3, the consumer wireless device 142 contains many components similar to those described above with respect to the fixed communication device 120. Specifically, the consumer wireless device 142 includes a CPU 180 and a memory 182. In general, the CPU 180 obtains data and instructions from the memory 182 and executes those instructions. The CPU 180 may be implemented by a number of devices, such as those described with respect to the CPU 150. Similarly, the memory 182 may be implemented in a variety of known technologies, such as those described above with respect to the memory 152.

The consumer wireless device 142 also includes a transmitter 184 and a receiver 186. As is known in the art, the receiver 186 of the consumer wireless device 142 searches for a base station with which to communicate. In some implementations of a wireless communication system, the consumer wireless device 142 may communicate with multiple base stations. In the system 100, the fixed communication devices 120-126 function as base stations to permit two-way communication between the consumer wireless device 142 and one or more of the fixed communication devices. In one embodiment, one or more of the fixed communication devices 120-126 may function as a "pseudo-base station," which may mimic the operation of a base station, but which is not actually connected to the service provider for the wireless communication system. In an alternative embodiment, one or more of the fixed communication devices 120-126 may be coupled to the service provider via the external network interface 164. In this embodiment, the fixed communication devices 120-126 have the same functionality as any base station for that particular service provider.

In some implementations, the receiver 186 searches for the "best" base station based on factors, such as signal strength, signal quality, or a selection parameter preprogrammed into the consumer wireless device 142. When the consumer wireless device locates a base station with which to communicate, the transmitter 184 transmits appropriate handshake signals to establish a two-way communication link between the consumer wireless device 142 and the fixed communication device 120.

In some implementations, the transmitter 184 and the receiver 186 share common circuitry and may be implemented as a transceiver 188. The transmitter 184 and receiver 186 are coupled to an antenna 189. Unlike the directional beam pattern of the antenna 160, the antenna 189 of the consumer wireless device is often implemented as an omnidirectional dipole antenna to provide the greatest possibility of detecting a suitable base station with which to communicate.

The consumer wireless device 142 also includes circuitry that is not required for implementation of the fixed communication device 120. For example, the consumer wireless device 142 includes a keypad 190, audio circuitry 191 and a display 192. The keypad 190 may be a typical wireless communication device keypad to permit the user to enter telephone numbers, and otherwise control the consumer wireless device 142. The key pad 190 may be used by the consumer to enter authorization data, such as a personal identification number (PIN) or the like to permit completion of the transaction. The audio circuitry 191 may include a microphone and speaker to allow two-way voice communications between the user and other portions of a wireless communication network. The display 192 may be a monochromatic or color display to provide the consumer with operational information. As implemented in the system 100, the display 192 may be readily used to provide the consumer with a visual display of identification data, authorization data or the like used to permit the completion of the transaction. In one implementation, the display 192 displays data transmitted to the consumer wireless device 142 by the fixed communication device 120. In an alternative embodiment, selected data may be transmitted to the consumer wireless device 142 based on the unique identification of that particular consumer wireless device. The data shown on the display 192 may be the data received from the fixed communication device 120 or, the data shown on the display may be altered by user action, such as the entry of a PIN code using the key pad 190. To prevent inadvertent or unauthorized viewing of data on the display 192, the data may be displayed in an encoded format. For example, bar code symbols or other symbology may be used to display data received from the fixed communication device 120 or data generated by the consumer wireless device 142.

The various components illustrated in FIG. 3 are coupled together by a bus system 193. The bus system 193 may include a power bus, address bus, control bus, data bus, and the like. For the sake of convenience, these various busses are illustrated in FIG. 3 as the bus system 193.

In an exemplary embodiment, the fixed communication devices 120-126 are capable of two-way data communications. For example, some communications systems employ short message service (SMS) capabilities in communications with the consumer wireless devices 140-146 along with their associated display capabilities.

As a person carrying one of the consumer wireless devices 140-146 moves into a coverage zone 130-138, the consumer wireless device detects the corresponding fixed communication device as the "best" base station. As previously noted, the selection of the best base station may be based on one or more factors, such as signal strength, signal quality, or a selection parameter preprogrammed into the consumer wireless device, taken alone or in combination. For example, as the consumer carrying the consumer wireless device 142 moves into the coverage zone 130, the consumer wireless device detects the fixed communication device 120 and selects that fixed communication device as the best base station.

When the consumer wireless device detects the fixed communication device 120, the consumer wireless device registers or associates with that fixed communication device. In a typical CDMA wireless communication network, the transmitter 154 of the fixed communication device 120 transmits a pilot signal for detection by any consumer wireless device. In this example embodiment, it is the pilot signal is transmitted over the coverage zone 130. As the consumer wireless device 142 moves within the coverage zone 130, the receiver 186 (see FIG. 3) detects the transmitted pilot signal from the fixed communication device 120. The consumer wireless device 142 will register or associate with the fixed communication device 120. Other wireless communication networks utilize control channels rather than a pilot signal to locate a base station. Those skilled in the art will appreciate that the principles described herein are applicable to any wireless communication network to detect the base station.

After one of the fixed communication devices 120-128 has been identified by the consumer wireless device as the "best" base station, a registration with that base station is performed. As part of the registration process, the consumer wireless device 142 transmits identification data, such as an electronic serial number (ESN), mobile identification number (MIN), or the like, to uniquely identify that consumer wireless device.

Figure 4:
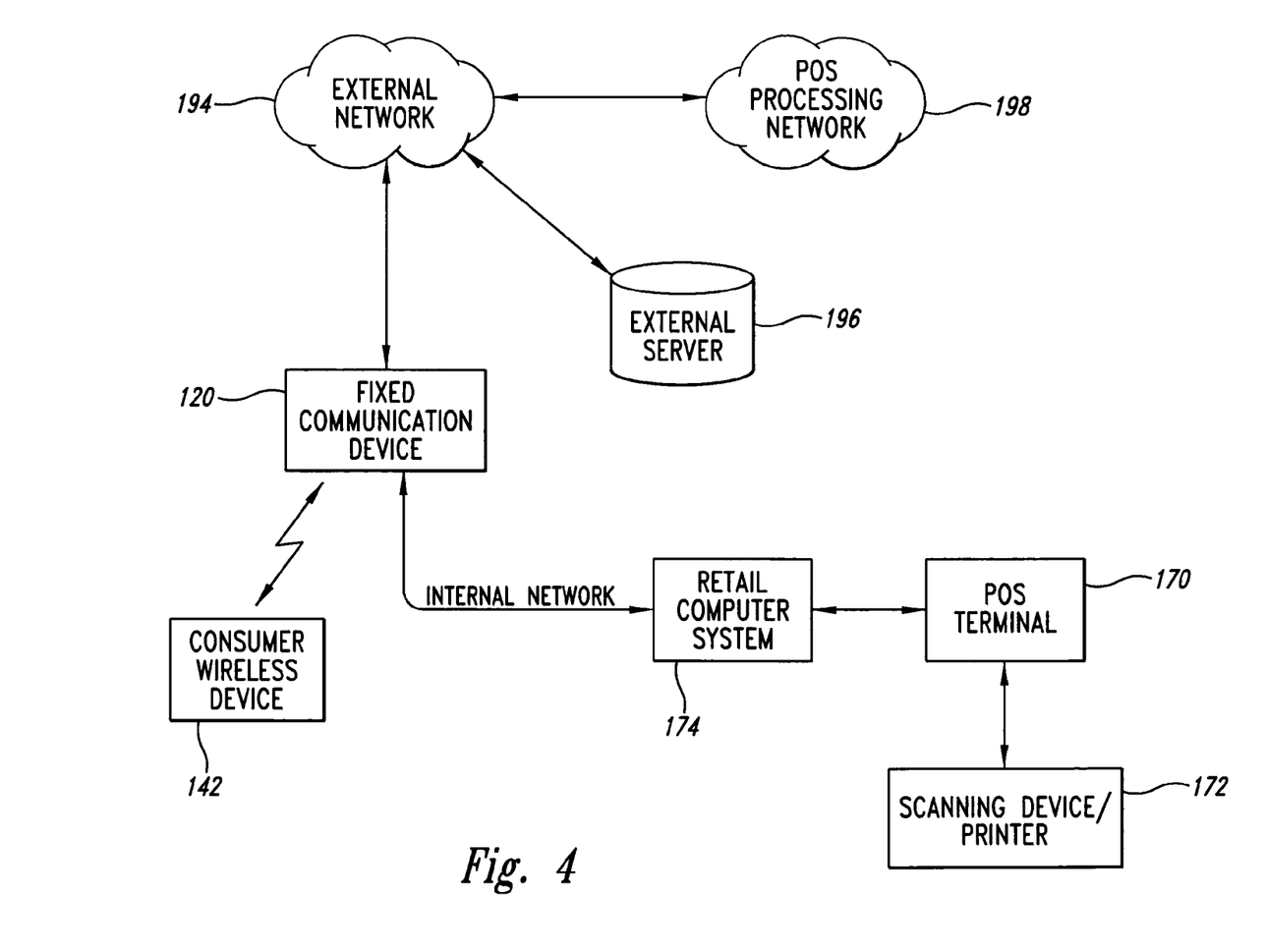
FIG. 4 illustrates one example embodiment of a system architecture constructed in accordance with the present teachings.

FIG. 4 illustrates an example architecture of the system 100. As illustrated in FIG. 4, the fixed communication device 120 communicates with the consumer wireless device 142 via a wireless connection. The fixed communication device 120 is, in turn, coupled to the retail computer system 174 via the internal network interface 162 (see FIG. 2). The POS terminal 170 and scanning device/printer 172 are also coupled to the retail computer system 174. The fixed communication device 120 receives some form of ID data from the consumer wireless device 142. That ID data may be transmitted to the retail computer system 174 via the internal network. The ID data transmitted by the consumer wireless device 142 may be used directly to uniquely identify the consumer operating the consumer wireless device. Alternatively, the ID data transmitted from the consumer wireless device may be used indirectly to derive final identification data, such as credit/debit card data, and the like.

FIG. 4 also illustrates the fixed communication device 120 coupled to an external network 194 via the external network interface 164 (see FIG. 2). An external server 196 is also coupled to the external network 194. The external server 196 may include a data structure containing validation data for use in uniquely identifying the consumer wireless device 142. The data structure may be in the form of a database, spreadsheet, lookup table, or the like. The system 100 is not limited by the particular form used to implement any data structure in the external server 196.

If the ID data transmitted from the consumer wireless device is used directly, the fixed communication device 120 may contact the external server 196, via the external network 194, to verify that the ID data corresponds to a valid consumer wireless device. The process may also be used to confirm that the wireless device has not been reported missing or stolen. Other forms of validation may also be implemented. If the ID data transmitted from the consumer wireless device 142 is used indirectly, the fixed communication device 120 may use the transmitted ID data as a form of pointer or index into the data structure on the external server 196. In turn, the external server 196 returns information, such as a credit/debit card number. The external server 196 may also return validation data indicating that the ID data transmitted from the consumer wireless device 142 corresponds to a valid device that has not been reported stolen or missing. Again, other forms of validation may also be implemented by the system 100.

A POS processing network 198 is also coupled to the external network 194 in the example embodiment illustrated in FIG. 4. Those skilled in the art will appreciate that consumer transactions executed by the POS terminal 170 frequently require authorization, such as a credit card authorization. In the architecture illustrated in FIG. 4, data from the POS terminal is relayed via the retail computer system 174, the fixed communication device 120 and the external network 194 to the POS processing network 198. The POS processing network 198 operates in a known fashion to authorize the transaction. Data returned from the POS processing network 198 may be in the form of transaction authorization data which is relayed back to the POS terminal 170.

Those skilled in the art will appreciate that the architecture illustrated in FIG. 4 is merely one example embodiment of the system 100. In one alternative embodiment, the retail computer system 174 may be coupled directly to the external network 194. In this embodiment, communications between the fixed communication device 120 and the external network 194 are conducted via the internal network and the retail computer system 174. However, the ID data, validation data, verification data, and the like may be processed or generated in a manner similar to that described above, with the data being relayed between the external network 194 and the retail computer system 174.

Figure 5:
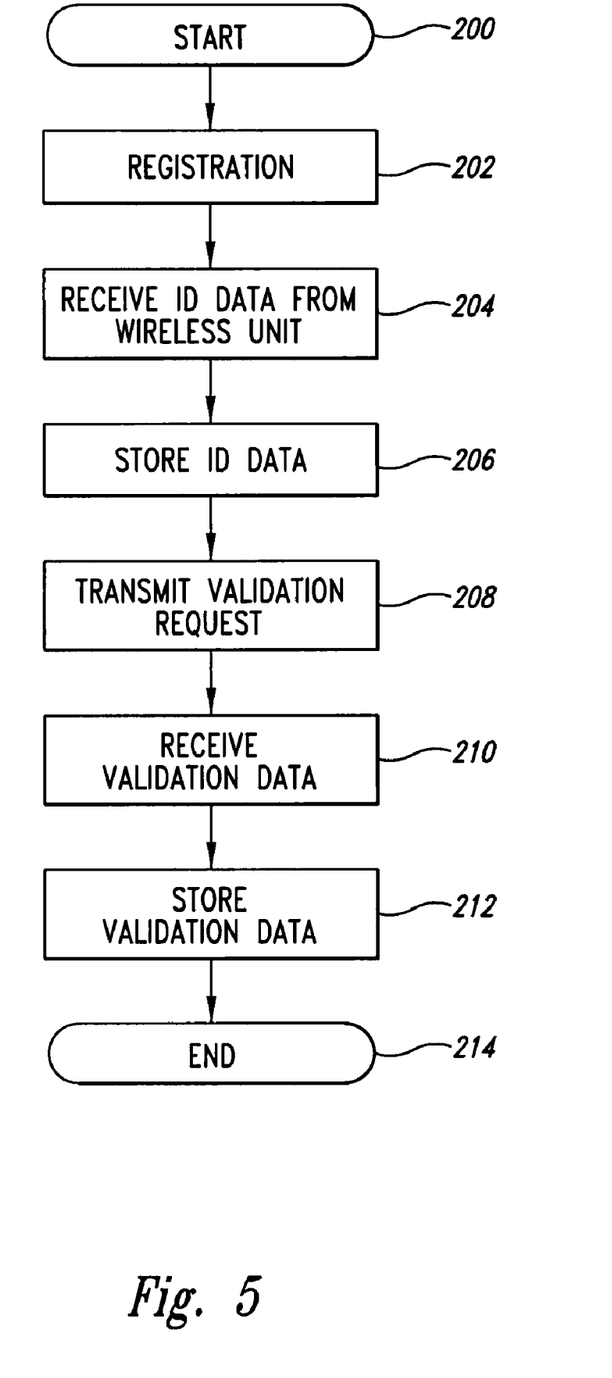
FIG. 5 is a flow chart illustrating the operation of the system to receive identification data from a wireless communication device.

The operation of the system 100 to register and identify consumer wireless devices is illustrated in the flow chart of FIG. 5. At a start 200, the various components of the system 100 are activated. At some point in time, a consumer wireless device (e.g., the consumer wireless device 142) enters a coverage zone (e.g., the coverage zone 130) of a fixed communication device (e.g., the fixed communication device 120 associated with the retail facility 104). As the consumer wireless device 142 enters the coverage zone 130, it detects the presence of the fixed communication device 120 and initiates a registration process. As noted above, the registration process may very based on the particular wireless communication protocol. For example, a wireless communication protocol for CDMA registration may differ from the wireless communication protocol for the registration of a GSM device. However, the fixed communication device 120 may be configured to operate in multiple modes to accommodate different communication protocols and multiple access architectures. The registration process is generically illustrated in FIG. 5 at step 202.

In step 204, the fixed communication device 120 receives identification (ID) data from the consumer wireless device 142. This data may be received as part of the registration process completed in step 200. The combination of MIN/ESN may serve to authenticate the wireless communication device 142 and thus provide a unique identification of that device. Alternatively, the fixed communication device 120 may transmit a query to the communication wireless device 142 to request some other form of identification data, such as a PIN or some other unique code known only to the owner of the consumer wireless device. The consumer may respond to the query by providing the requested identification data. Thus, step 204 is intended to encompass not only the MIN/ESN as well as other forms of unique identification data.

In step 206, the fixed communication device 120 stores the ID data at least temporarily. The ID data may be stored in the memory 152 (see FIG. 2). Alternatively, the fixed communication device 120 may store the received ID data in a data structure associated with the retail computer system 174 by transmitting the data via the internal network interface 162 or in a data structure associated with an external computer (not shown) by transmitting the data via the external network interface 164. As will be described in greater detail below, the ID data is stored for future transactions with the consumer.

Following step 206, the system 100 may initiate a validation process, which is also illustrated in the flow chart of FIG. 5 The validation process may be used to determine the validity of the ID data. For example, the combination of the MIN/ESN is unique for each consumer wireless device. A cloned wireless device having a piroted MIN or ESN can be detected in this manner. Furthermore, the validation process may be used to determine whether the consumer wireless device has been reported lost or stolen. The actual procedure for validation may vary based on the implementation. For example, if the validation process includes a verification of the MIN/ESN combination, the system 100 must contact the wireless service provider via the external network interface 164 (see FIG. 2) and request validation. A similar process may be performed with the consumer's wireless service provider to determine whether the consumer wireless device has been reported lost or stolen. Other unique forms of ID data, such as a PIN, may be stored within the system 100. For example, the retail computer system 174 may contain a list of PIN numbers for its customers and associate those PINs with a customer name and/or customer numeric data, such as the MIN and/or ESN. If a PIN or other unique code is used as the ID data, the validation process will query the consumer and request entry of the unique code. That unique code may be compared against the stored data in the retail computer system 174 to provide the appropriate validation. In addition, the validation process may be used as a form of pre-authorization to determine a financial limit on any commercial transaction where the consumer may be charged for goods and/or services.

In step 208, the fixed communication device 120 transmits a validation request. As described above, the validation request may be transmitted to the retail computer system 174 within the retail facility, via the internal network interface 162 (see FIG. 2) or to the external network 194 via the external network interface 164.

In step 210, the system 100 receives the validation data from the validation source and, in step 112, the validation data is stored at least temporarily. As with ID data, the validation data may be stored in the memory 152 (see FIG. 2) or on a data storage device of the retail computer system 174 via the internal network interface 162 or the external server 196 coupled to the external network 194. The process ends at 214 with the consumer wireless device 142 having been uniquely identified and validation data having been received and associated with the consumer wireless device.

Those skilled in the art will recognize that the flow chart of FIG. 5 illustrates an exemplary embodiment and that many alternatives are possible within the scope of the present disclosure. For example, the validation process illustrated at steps 208-212 may be performed prior to any transaction, as described above. However, the validation process may be executed concurrently during a transaction, or even after a transaction. In addition, the system 100 has been described with the fixed communication device 120 performing the steps illustrated in the flow chart of FIG. 5. However, those skilled in the art will recognize that the ID data may be transmitted from the fixed communication device 120 to the retail computer system 174 (see FIG. 2) within the retail facility (e.g., the retail facility 104 of FIG. 2) with the validation process being executed by the retail computer system.

In one embodiment, the POS terminal 170 may perform the validation request process of 208-212. Those skilled in the art will appreciate that the POS terminal 170 is designed for just such transactions. The POS terminal 170 may typically be configured to receive credit card or debit card information via a magnetic strip reader and to execute a validation process as part of the transaction. In the same manner, an implementation of the system 100 can provide the POS terminal 170 with the ID data received from the consumer wireless device 142. The ID data can be used in place of credit card data with the POS terminal 170 performing essentially the same validation process steps using the ID data in place of credit card data.

In yet another alternative, embodiment, the MIN/ESN data can be used as a reference to a data structure (i.e., a data storage device, database, data table, spreadsheet, or the like) to retrieve credit card data associated with the MIN/ESN. The data structure may be contained within the retail computer system 174 and accessible via the internal network or may be contained within the external server 196 and accessible via the external network 194. In this embodiment, the actual credit card data may be used as the ID data stored in step 206. In this embodiment, the POS terminal 170 receives actual credit card or debit card information for use in the validation process of steps 208-212. Thus, it should be appreciated that the term "ID data" should be interpreted broadly enough to encompass unique identifying data transmitted from the consumer wireless devise 142 as well as data, such as credit/debit card information, that may be derived based on information received from the consumer wireless device.

In yet another alternative embodiment, a retail facility may have a plurality of POS terminals 170. In an exemplary embodiment, the ID data and validation data may be accessible to one or more of the plurality of POS terminals 170. As described above, the ID data and validation data are temporarily stored. Thus, a consumer may visit various parts of the large retail facility and conduct multiple transactions at different POS terminals. The temporarily stored ID data and validation data may be used within the retail facility by more than one POS terminal 170. In this manner, a customer may need to undergo the identification and validation process only one time upon coming within range of the fixed communication device (e.g., the fixed communication device 120 of FIG. 2) for all transactions while the consumer is in the retail facility.

As discussed above, the ID data and validation data is stored at least temporarily. The ID data and validation data may be purged after a single transaction. This may be common in a small retail facility where the consumer is likely to complete only a single transaction. Alternatively, the ID data and validation data may be stored for a predetermined period of time (e.g., 30 minutes) following initial registration to allow the consumer to complete multiple transactions without the need for a re-identification and revalidation processes. This implementation may be desirable in a larger retail facility where the consumer may complete multiple transactions in a single visit. This implementation may be desirable in a large retail facility having a plurality of POS terminals 170.

In yet another alternative embodiment, the ID data and validation data may be stored for a predetermined period of time following the completion of the transaction to allow the consumer additional time to complete other transactions. Alternatively, the consumer may change his or her mind and wish to reverse the transaction. Temporary storage of the ID data and validation data locally permits a simplified transaction reversal process.

Figure 6:
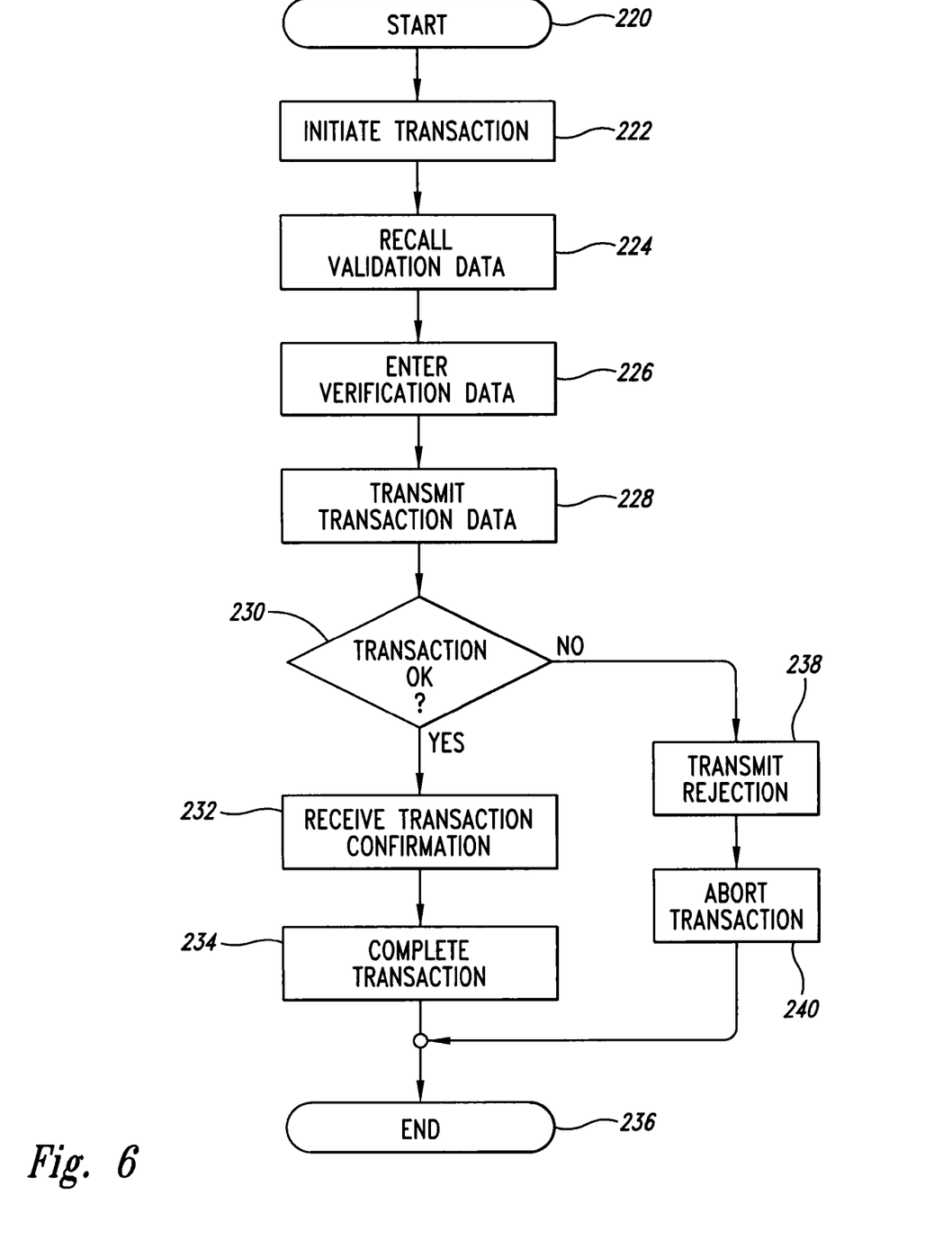
FIG. 6 is a flow chart illustrating the operation of the system for transaction completion within a retail facility.

FIG. 6 is a flow chart illustrating the operation of the system 100 to complete a transaction. At a start 220, the system 100 has received and stored ID data from the consumer wireless device (e.g., the consumer wireless device 142 of FIG. 2). In an exemplary embodiment, the validation process illustrated in steps 208-212 has been completed. However, as noted above, the validation process may also be performed during or after completion of the transaction.

In step 222, the consumer initiates a transaction. The term "transaction" may involve the sale of goods and/or services, but may also be considered to include free goods and/or services. Thus, transactions need not always involve the exchange of money.

In step 224, the system 100 recalls the validation data. As discussed before, the validation data may be stored in the memory 152 (see FIG. 2) or in, by way of example, the retail computer system 174.

In step 226, verification data is entered into the system. Verification data may include cost data if the transaction involves money. Verification data may also give the consumer a final opportunity to review and authorize completion of the transaction. The verification data may be entered manually using, by way of example, the POS terminal 170. Alternatively, the verification data may be transmitted to the consumer wireless device 142 by the fixed communication device 120. Information related to the transaction may be shown, by way of example, on the display 192 (see FIG. 3) of the consumer wireless device 142. The consumer may review the verification data and enter an affirmative response to the verification data, such a PIN via the keypad 190 on the consumer wireless device 142. Alternatively, the consumer may enter some other code consisting of one or more alpha numeric characters, which is known only to the consumer viewing the verification data request on the display 192.

If the verification data is transmitted to the consumer wireless device 142, the consumer may enter the PIN or other code, as described above, and transmit the entered code back to the fixed communication device 120. Alternatively, the consumer may enter the PIN or other code to thereby generate a data display of alphanumeric or symbology on the display 192. The display 192 may be scanned by the scanning device/printer 172 (see FIG. 2), which is typically part of the POS terminal 170. Thus, the consumer has the opportunity to verify the transaction details prior to completion of the transaction.

In yet another alternative embodiment, the employee in the retail facility may optionally select a PIN or other code provided by the person from a list of numbers displayed on the POS terminal 170 and may manually enter the verification data via keypad or keyboard attached to the POS terminal. Other data, such as a purchase amount for a commercial transaction may also be manually entered by the retail facility employee or entered via the scanning device/printer 172, as common in retail facilities.

In step 228, the system 100 transmits transaction data. As noted above, the transaction data may include, by way of example the ID data, the validation data, the verification data, or combinations thereof. In one embodiment, the transaction may involve a monetary charge to the consumer. The charge may be made against the consumer's wireless device and billed through the consumer's service provider. Service providers commonly act as an intermediate billing agent for services, such as daily horoscopes, daily jokes, ring tones, consumer chat lines, and the like. Such services are typically billed via the wireless service provider. In a similar fashion, the transaction executed in the retail services facility may also be charged to the consumer's wireless service provider.

Alternatively, the ID data, validation data, and verification data, may be used to charge the consumer's credit/debit card or other financial account, as is known in the art. In an exemplary embodiment, the POS terminal 170 may transmit the ID data, validation data, verification data, or combination thereof, along with the transaction data, to a processing facility capable of processing the transaction by verifying the usual components of a commercial transaction, including the match of the ID data that uniquely matches the consumer wireless device 142. In one embodiment, the processing facility is the POS processing network 198 (see FIG. 4) accessible via the external network 194.

Either the retail facility or a third party transaction processor will approve the transaction request. If the transaction is OK, the result of decision 230 is YES and, in step 232, the system 100 receives a transaction confirmation. In step 234, the transaction is completed. This may include printing a receipt or other confirmation on the scanning device/printer 172 (see FIG. 2) the process ends at 236.

If the transaction is not approved for some reason, the result of decision 230 is NO. In that event, the transaction is rejected and, in step 238, the fixed communication device 120 may transmit a rejection notification to the consumer wireless device 142 and, in step 240 the transaction is aborted. The process ends at 236 following abortion of the transaction.

The transaction may be rejected for a number of reasons. For example, the monetary cost of the transaction may exceed predetermined authorization or validation levels. In another example, the consumer may not be authorized to complete the transaction. For example, the transaction may involve the purchase of alcohol or tobacco. If the user data retrieved during the validation process indicates that the owner of the consumer wireless device is underage, the particular transaction may be rejected even though consumer purchases of other goods within the retail facility may be authorized. In yet another example, the consumer may be asked to enter additional ID or validation data. In this example, the rejection message transmitted in step 238 may be a request for additional information. If the additional information is provided, the authorization may be subsequently granted and the transaction need not be aborted.

Thus, the communication system 100 comprises short range base stations that communicate with conventional consumer wireless devices to transmit coupon messages when the consumer wireless device moves to within a short range coverage zone, which is typically in an area proximate the retail facility. This process allows the consumer wireless device to be used in the process of completing a transaction.

It can be appreciated that the various forms of data (i.e., ID data, validation data, verification data, transaction data, and the like) must be transmitted in a secure fashion. Although not discussed in any detail herein, it can be appreciated that these forms of data can be encrypted using many known forms of encryption. The system 100 is not limited by any particular form of data encryption that may be used to protect the data transmitted wirelessly between the fixed communication device 120 and the consumer wireless device 142 as well as data transmitted on the internal network and the external network. Appropriate forms of security are applied to reduce vulnerability of the system against potential misuse. Similarly, appropriate forms of data security are applied to data structures that may be contained within the retail computer system 174 (see FIG. 4) or the external server 196. Similarly, data security measures are commonly applied to the POS processing network 198.

The foregoing described embodiments depict different components contained within, or connected with, different other components. It is to be understood that such depicted architectures are merely exemplary, and that in fact many other architectures can be implemented which achieve the same functionality. For example, the techniques described herein may be implemented as a computer-readable medium containing instructions to control a computer for wireless transactions using a fixed location base station for short-range communication with a consumer wireless device.

In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for wireless point-of-sale transactions for use with frequencies licensed for wide-area networks, the system comprising:
    a plurality of retail facilities open to consumers;
    a transmitter associated with each of the plurality of retail facilities and located proximate the respective retail facility, the transmitter configured to have a limited transmission range on licensed frequencies and to transmit data communications to a consumer wireless device;
    a receiver associated with each of the plurality of retail facilities and configured to receive data communications from the consumer wireless device;
    an antenna operatively coupled to each respective transmitter and receiver; and
    a controller associated with each of the plurality of retail facilities and operatively coupled to the respective transmitter and receiver, each controller being configured to detect when the consumer wireless device is within range of the associated transmitter, and upon detection that the consumer wireless device is within range of the associated transmitter, the controller being configured to communicate with the consumer wireless device in a base station registration process between the consumer wireless device and the controller, the controller being configured to receive identification data associated with the consumer wireless device that uniquely identifies the consumer wireless device and to use the received identification data to complete a transaction within the retail facility.

2. The system of claim 1 wherein the identification data comprises an electronic identification data of the consumer wireless device received by the receiver.

3. The system of claim 1 wherein the consumer wireless device has pre-programmed electronic identification data and the controller is configured to use the electronic identification data of the consumer wireless device received by the receiver to obtain the identification data.

4. The system of claim 1 wherein the identification data is credit/debit card data of the consumer obtained by the controller in response to the receipt of the electronic identification data of the consumer wireless device received by the receiver.

5. The system of claim 1, further comprising a data storage structure configured to store the identification data.

6. The system of claim 5 wherein the controller is configured to delete the stored identification data upon completion of the transaction.

7. The system of claim 5 wherein the controller is configured to delete the stored identification data at a predetermined time following completion of the transaction.

8. The system of claim 1 wherein the controller is further configured to obtain a transaction authorization to complete the transaction.

9. The system of claim 1 wherein the transaction is a monetary transaction and the controller is further configured to obtain transaction authorization to complete the transaction if the monetary value of the transaction exceeds a predetermined threshold.

10. The system of claim 1 wherein the controller is further configured to generate transaction identification data to document the transaction.

11. The system of claim 1, further comprising a network interface configured to communicate with a computer network.

12. The system of claim 11, further comprising a data storage structure coupled to the computer network and configured to store the identification data.

13. The system of claim 11 the identification data is credit/debit card data of the consumer obtained by the controller via the computer network in response to the receipt of the electronic identification data of the consumer wireless device received by the receiver.

14. The system of claim 11 wherein the controller is further configured to obtain a transaction authorization via the computer network to complete the transaction.

15. The system of claim 1 for use with a consumer wireless device having a display, the system further comprising a scanning device associated with the retail facility to scan the consumer wireless device display to thereby obtain the identification data.

16. The system of claim 15 wherein the scanning device is part of a point-of-sale (POS) terminal, the POS terminal being configured to use the identification data to complete the transaction.

17. The system of claim 15 wherein the identification data on the consumer wireless device display is encoded and the scanning device reads the encoded data displayed on the consumer wireless device display.

18. The system of claim 15 wherein the identification data on the consumer wireless device display is encoded using symbology data and the scanning device reads the symbology data displayed on the consumer wireless device display.

19. The system of claim 1 for use with a consumer wireless device having a display, the system further comprising a scanning device associated with the retail facility to scan the consumer wireless device display to thereby obtain a transaction authorization to complete the transaction.

20. The system of claim 19 wherein the scanning device is part of a point-of-sale (POS) terminal, the POS terminal being configured to use the transaction authorization to complete the transaction.

21. A method for wireless transactions for use with frequencies licensed for wide-area wireless communication networks, the method comprising:
configuring a fixed location base station for short-range communication with a consumer wireless device, the base station associated with a retail facility and operable to communicate on the licensed frequencies in a manner consistent with normal operation of the consumer wireless device operating at the licensed frequencies;
communicating with a consumer wireless device that comes with range of the base station, the communication including data transmitted from the consumer wireless device to the base station;
based on the data received from the consumer wireless device, obtaining identification data that uniquely identifies a consumer associated with the consumer wireless device; and
using the identification data to complete a transaction between the retail facility and the consumer.

22. The method of claim 21 wherein the identification data comprises an electronic identification data of the consumer wireless device.

23. The method of claim 21 wherein the consumer wireless device has pre-programmed electronic identification data, the method further comprising using the electronic identification data of the consumer wireless device to obtain the identification data.

24. The method of claim 23 wherein the identification data is credit/debit card data of the consumer.

25. The method of claim 24 for use with a computer network having a data structure for storing data wherein obtaining the identification data uses the data storage structure coupled to the computer network.

26. The method of claim 21, further comprising storing the identification data.

27. The method of claim 26, further comprising deleting the stored identification data upon completion of the transaction.

28. The method of claim 26, further comprising deleting the stored identification data at a predetermined time following completion of the transaction.

29. The method of claim 26 for use with a computer network having a data structure for storing data wherein storing the identification data uses the data storage structure coupled to the computer network.

30. The method of claim 21, further comprising obtaining a transaction authorization to complete the transaction.

31. The method of claim 21 wherein the transaction is a monetary transaction, the method further comprising obtaining a transaction authorization to complete the transaction if the monetary value of the transaction exceeds a predetermined threshold.

32. The method of claim 21, further comprising generating transaction identification data to document the transaction.

33. A method for conducting a transaction using a consumer wireless device operable with frequencies licensed for wide-area wireless communication networks, the method comprising:
configuring a two-way communication station for short-range communication, the communication station functioning as a base station associated with a retail facility and having a transmitter and a receiver operable to communicate with one or more consumer wireless devices on the licensed frequencies in a manner consistent with normal operation of consumer wireless devices operating at the licensed frequencies;
detecting the communication station by the consumer wireless device;
selecting the communication station as a base station;
registering with the selected base station in a manner consistent with normal operation of consumer wireless devices operating at the licensed frequencies to thereby establish a wireless communication link between the consumer wireless device and the selected base station;
receiving data from the consumer wireless device via the wireless communication link;
based on the data received from the consumer wireless device, obtaining identification data that uniquely identifies a consumer associated with the consumer wireless device; and
using the identification data to complete a transaction between the retail facility and the consumer.

34. The method of claim 33 wherein the identification data comprises an electronic identification data of the consumer wireless device.

35. The method of claim 33 wherein the consumer wireless device has pre-programmed electronic identification data, the method further comprising using the electronic identification data of the consumer wireless device to obtain the identification data.

36. The method of claim 35 wherein the identification data is credit/debit card data of the consumer.

37. The method of claim 36 for use with a computer network having a data structure for storing data wherein obtaining the identification data uses the data storage structure coupled to the computer network.

38. The method of claim 33, further comprising storing the identification data.

39. The method of claim 38, further comprising deleting the stored identification data upon completion of the transaction.

40. The method of claim 38, further comprising deleting the stored identification data at a predetermined time following completion of the transaction.

41. The method of claim 38 for use with a computer network having a data structure for storing data wherein storing the identification data uses the data storage structure coupled to the computer network.

42. The method of claim 33, further comprising obtaining a transaction authorization to complete the transaction.

43. The method of claim 33 wherein the transaction is a monetary transaction, the method further comprising obtaining a transaction authorization to complete the transaction if the monetary value of the transaction exceeds a predetermined threshold.

44. The method of claim 33, further comprising generating transaction identification data to document the transaction.

45. A computer-readable medium containing instructions to control a computer for wireless transactions using a fixed location base station for short-range communication with a consumer wireless device, the base station associated with a retail facility and operable to communicate on frequencies licensed for wide-area wireless communication networks, the computer-readable medium having instructions that cause the computer to:
   communicate with a consumer wireless device that comes within range of the base station in a manner consistent with normal operation of consumer wireless devices operating at the licensed frequencies, the communication including data transmitted from the consumer wireless device to the base station;
   based on the data received from the consumer wireless device, obtain identification data that uniquely identifies a consumer associated with the consumer wireless device; and
   use the identification data to complete a transaction between the retail facility and the consumer.

46. The computer-readable medium of claim 45 wherein the identification data comprises an electronic identification data of the consumer wireless device.

47. The computer-readable medium of claim 45 wherein the consumer wireless device has pre-programmed electronic identification data, the computer-readable medium further comprising instructions that cause a computer to use the electronic identification data of the consumer wireless device to obtain the identification data.

48. The computer-readable medium of claim 47 wherein the identification data is credit/debit card data of the consumer.

49. The computer-readable medium of claim 48 for use with a computer network having a data structure for storing data wherein the computer instructions cause the computer to obtain the identification data from the data storage structure coupled to the computer network.

50. The computer-readable medium of claim 45, further comprising instructions that cause the computer to store the identification data.

51. The computer-readable medium of claim 50, further comprising instructions that cause the computer to delete the stored identification data upon completion of the transaction.

52. The computer-readable medium of claim 50, further comprising instructions that cause the computer to delete the stored identification data at a predetermined time following completion of the transaction.

53. The computer-readable medium of claim 50 for use with a computer network having a data structure for storing data wherein the instructions that cause the computer to store the identification data uses the data storage structure coupled to the computer network.

54. The computer-readable medium of claim 45, further comprising instructions that cause the computer to obtain a transaction authorization to complete the transaction.

55. The computer-readable medium of claim 45 wherein the transaction is a monetary transaction, the computer-readable medium further comprising instructions that cause the computer to obtain a transaction authorization to complete the transaction if the monetary value of the transaction exceeds a predetermined threshold.

56. The computer-readable medium of claim 45, further comprising instructions that cause the computer to generate transaction identification data to document the transaction.

57. A method for wireless transactions for use with frequencies licensed for wide-area wireless communication networks, the method comprising:
   configuring a plurality of fixed-location base stations for short-range communication with a consumer wireless device in a manner consistent with normal operation of a consumer wireless device operating at the licensed frequencies, each of the plurality of base stations associated with a retail facility and operable to communicate on the licensed frequencies;
   the consumer wireless device automatically selecting one of the plurality of base stations with which to communicate;
   performing a registration process with the selected base station to thereby establish a communication link between the consumer wireless device and the selected base station;
   based on the data received from the consumer wireless device, obtaining identification data that uniquely identifies a consumer associated with the consumer wireless device; and
   using the identification data to complete a transaction between the consumer and the retail facility associated with the selected base station.

58. The method of claim 57 wherein selecting one of the plurality of base stations with which to communicate comprises using a selection criterion selected from a set of selection criteria comprising received signal strength and received signal quality.

59. The method of claim 57, further comprising:
   the consumer wireless device automatically selecting a second of the plurality of base stations with which to communicate;
   performing a registration process with the second base station to thereby establish a communication link between the consumer wireless device and the second base station;
   based on the data received from the consumer wireless device, obtaining identification data that uniquely identifies a consumer associated with the consumer wireless device; and
   using the identification data to complete a transaction between the consumer and the retail facility associated with the second base station.

60. The method of claim 59, further comprising terminating the communication link between the consumer wireless device and the selected base station.

* * * * *